P. J. SIMMEN.
AUTOMATIC MOVING VEHICLE CONTROL.
APPLICATION FILED MAY 5, 1915.
1,183,597.
Patented May 16, 1916.
2 SHEETS—SHEET 1.
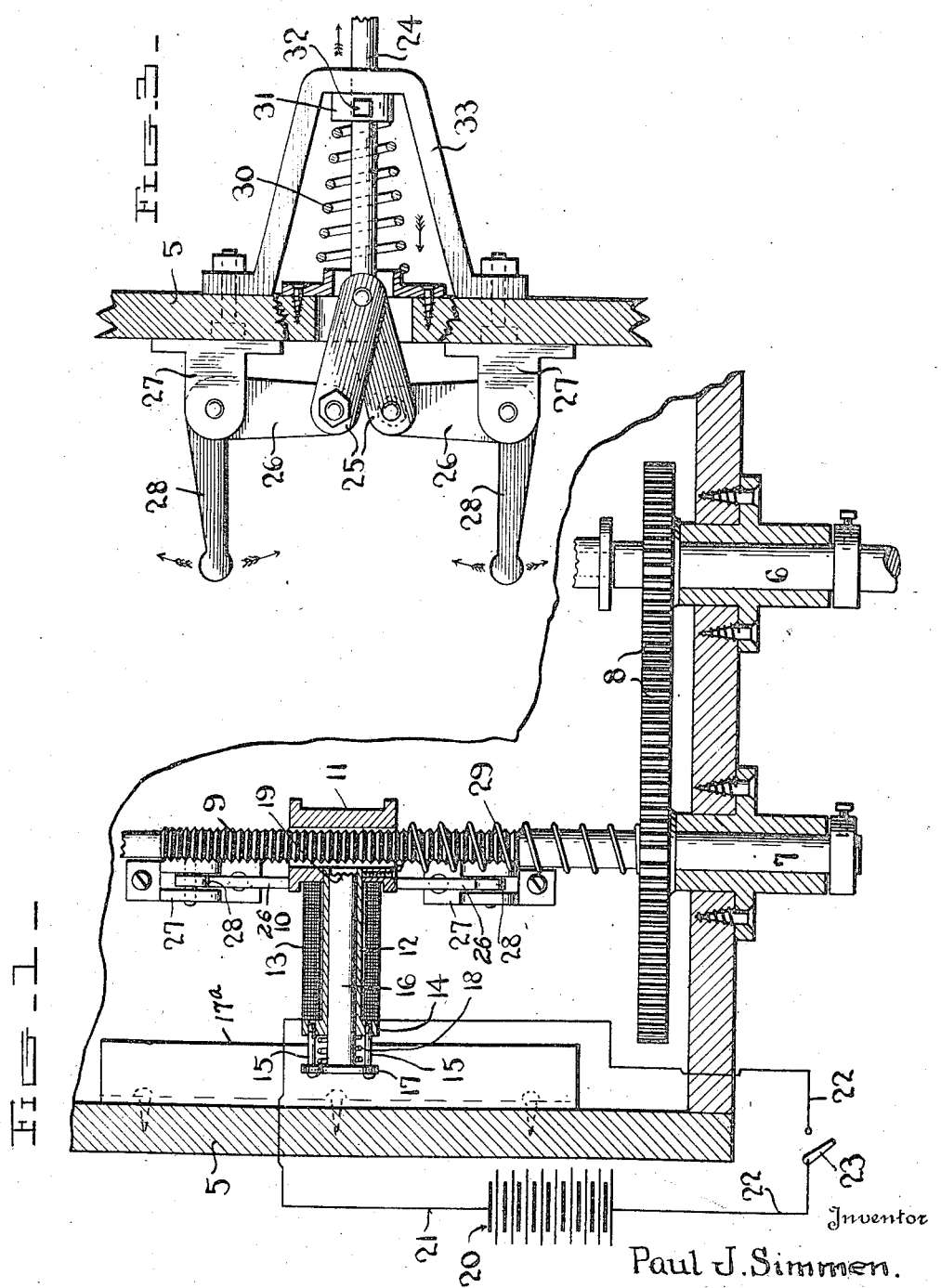
Inventor
Paul J. Simmen.
By William R. Baird
his Attorney

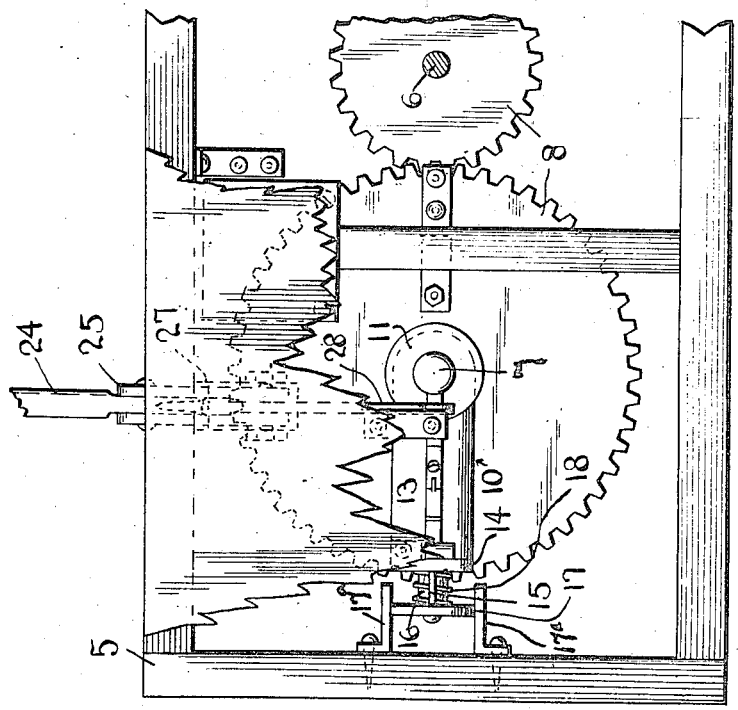
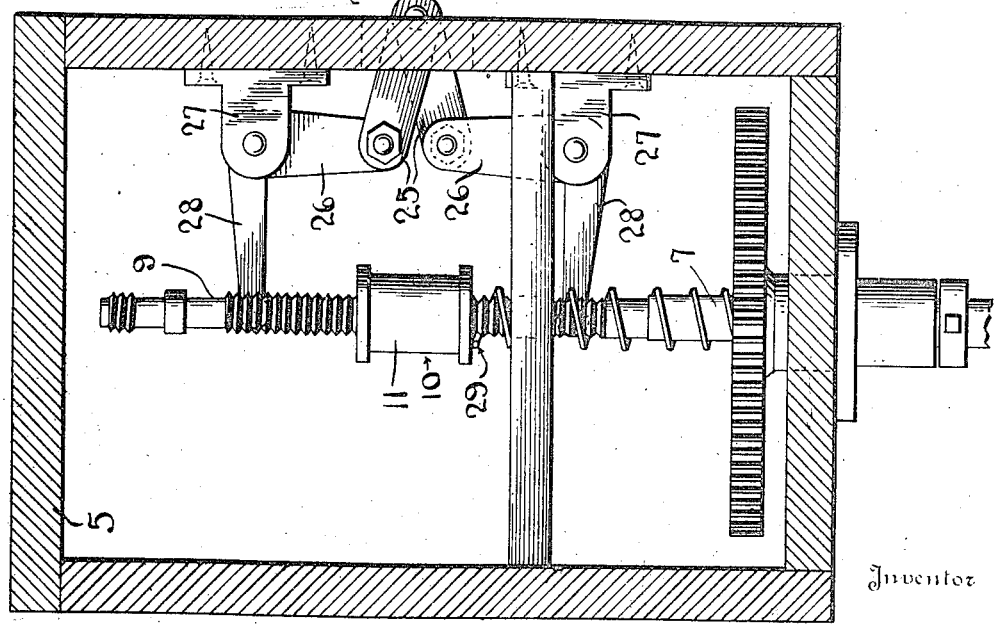

UNITED STATES PATENT OFFICE.

PAUL JOHN SIMMEN, OF BUFFALO, NEW YORK.

AUTOMATIC MOVING VEHICLE CONTROL.

1,183,597. Specification of Letters Patent. Patented May 16, 1916.

Original application filed April 14, 1908, Serial No. 427,080. Divided and this application filed May 5, 1915. Serial No. 26,085.

*To all whom it may concern:*

Be it known that I, PAUL JOHN SIMMEN, a citizen of the United States, residing at Buffalo, in the county of Erie and State of New York, have invented certain new and useful Improvements in Automatic Moving Vehicle Control, of which the following is a specification.

The present invention relates more particularly to devices employed in connection with the automatic control of vehicles, and is a division of my application which has eventuated in Patent No. 1,150,308, dated August 17, 1915.

The object of the invention is to provide a driving member and a driven member that may be operated thereby to actuate suitable mechanism, together with means whereby the driven member can be effectively thrown into operation or disengaged from the driving member.

A simple embodiment of the invention is illustrated in the accompanying drawings, wherein:—

Figure 1 is a vertical sectional view through the mechanism in question, parts unnecessary to an understanding thereof being eliminated for the sake of clearness and simplicity. Fig. 2 is a sectional view at right angles to Fig. 1. Fig. 3 is a detail sectional view of the elements moved by the driven member or controller. Fig. 4 is a top plan view.

Similar reference numerals designate corresponding parts in all the figures of the drawings.

In the embodiment disclosed, a portion of a casing 5 is illustrated, in which is journaled a spindle 6 operated from any suitable source of power, and a driving spindle 7, the two being geared together, as illustrated at 8. A portion of the spindle 7, located within the casing 5, is provided with screw threads 9. Mounted to slide upon the screw threaded portion of the spindle 7 is a driven member or controller designated generally by the reference numeral 10, and including a sleeve 11 surrounding said spindle and having a bore of sufficient diameter to clear the threads 9. Projecting from one side of this sleeve is a tubular support 12, preferably of non-magnetic material, and having wrapped thereon an electro-magnet coil 13. The rear end of this tube 12 is in the form of an enlarged flange 14 from which projects guide pins 15.

Slidably mounted in the tube 12, and consequently within the coil 13, is a core or armature 16 having a head 17 at its outer end that is slidably mounted on the guide pins 15. A spring 18 surrounds the core between the flange 14 and the head 17 and serves to normally hold the said core in its outward position. The inner end of the said core has teeth 19 that are movable into threaded engagement with the thread 9 of the spindle 7, whenever the coil 13 is energized. Suitable means is, of course, employed for energizing the coil, this means being generally and diagrammatically shown in the present instance as a battery 20, having a lead wire 21 connected to one terminal of the coil 13 and another lead wire 22 leading to the other terminal of said coil, suitable switch mechanism shown diagrammatically at 23 being employed for opening and closing the circuit. The showing of the switch mechanism at 23, it will be understood is for general diagrammatic purposes and in order to indicate a complete electric circuit. For examples of actual controlling means that may be employed, attention is called to the parent application, Serial No. 427,080 already referred to. The controller is held against rotation by and is slidable between guides 17ª.

The part to be moved by the controller or driven member 10 is a rod 24 that is attached to any suitable traffic controlling means or other mechanism to be actuated. This rod has link connections 25 with a pair of bell crank levers 26 fulcrumed in bearings 27 secured to the casing 5, the bell crank levers having arms 28 projecting into the path of the controller 10 on opposite sides of the same.

It will be understood that the spindle 7 is disposed in a vertical relation, and consequently if the controller 10 is moved upwardly by said spindle and is then released therefrom, it will drop to its original position by gravity. This position is determined by a spring 29 surrounding the said spindle 7 and resting on the gear wheel 8 fixed thereto, the controller when in its inactive position resting upon the upper end of the spring. It will therefore also be clear that if the controller 10 moves downward, the spring will be compressed, and when said controller is released from the spindle, the spring will react to return it to its initial position. It will also be seen that irrespective of the direction in which the controller moves, if moved far enough, it will engage one of the arms 28 of the bell cranks 26, and thus swing the same to move the actuating rod 24 toward the casing. The return movement of this actuating rod is accomplished by a spring 30 surrounding the rod, one end of the spring having a bearing against the outside of the casing 5, the other end bearing against a collar 31 adjustably fixed to the rod 24 by a set screw 32. The movement of the rod away from the casing is restricted by a stop yoke 33 secured to the casing and having a portion disposed in the path of the collar 31 which abuts against it, as will be clear by reference to Fig. 3.

With this structure, it will be noted that as long as the coil 13 is deënergized, the parts will be as shown in Fig. 1. That is to say, the core 16 will be in its retracted position, and the teeth 19 out of mesh with the screw. The constant rotation of the screw 9 from the shaft 6, therefore, has no effect upon the controller. If, however, the switch mechanism 23 is closed, a circuit is established which includes the magnet 13, so that the core 16 is drawn into the same and the teeth 19 are brought into mesh with the threads 9. Consequently, the controller 10 will be moved in one of two opposite directions, depending on the direction of rotation of the spindle 7, and this movement will continue until one of the bell cranks is engaged and actuated. The opening of the switch mechanism causes the deënergization of the electro-magnet, the core 16 is retracted, and as already explained, the controller moves back to its initial position.

From the foregoing it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In an apparatus of the character described, a movable controller comprising a sleeve, a solenoid secured thereto and moving therewith, a spindle adapted to be embraced by the sleeve and means for causing a moving engagement between the spindle and the solenoid to move the controller.

2. In an apparatus of the character described, a movable controller comprising a sleeve, a solenoid secured thereto and moving therewith, a spindle adapted to be embraced by the sleeve and means for causing a moving engagement between the spindle and the solenoid to move the controller and including threads on the spindle and coöperating teeth on the core of the solenoid.

3. In apparatus of the character set forth, a rotary spindle, a controller having a back and forth movement and movable by the spindle, means engaging and driving the spindle to operate the controller, and means for returning the controller after its movement by the spindle when said first means is disengaged from the spindle.

4. In apparatus of the character set forth, a rotary spindle having a threaded portion, a controller having a back and forth movement along the spindle, means engaging and disengaging the threaded portion of the spindle to operate the controller, and means for automatically returning the controller after its movement by the spindle when said first means is disengaged from the threaded portion.

5. In apparatus of the character set forth, a rotary spindle having a threaded portion, a controller having a back and forth movement along the spindle, means engaging and disengaging the threaded portion of the spindle to operate the controller, and a spring surrounding the spindle and bearing against the controller, said spring being placed under tension when the controller is moved by the spindle and returning said controller when the means is disengaged from the threaded portion.

6. In an apparatus of the character described, a rotating spindle threaded for a portion of its length, a controller including a sleeve adapted to slidably engage the spindle, and means adapted to cause a temporary engagement between the controller and the spindle threads whereby the rotation of the spindle causes the controller to move along the spindle, in combination with means for automatically returning the controller to its normal position.

7. In mechanism of the character set forth, a rotatable screw and a member having a back and forth movement, one of said members traversing the other, said second member including an electro-magnet, an armature actuated thereby, and a tooth moved by the magnet and movable into and out of engagement with the screw and adapted to cause the said traversing movement.

8. In mechanism of the character set forth, a rotatable screw, a controller movable longitudinally along the same, an electro-magnet on the controller, and an armature actuated by the electro-magnet and having a tooth movable therewith into and out of engagement with the screw.

9. In mechanism of the character set forth, a rotatable screw, a controller having a sleeve slidable longitudinally along the screw, an electro-magnet mounted on the sleeve, and an armature slidable in the magnet and having a tooth movable into and out of engagement with the screw.

In testimony whereof I affix my signature in the presence of two witnesses.

PAUL JOHN SIMMEN.

Witnesses:
L. RINGER,
GEORGE P. SIMMEN.